United States Patent
Brita

(10) Patent No.: US 11,673,981 B2
(45) Date of Patent: Jun. 13, 2023

(54) ZN CATALYST COMPONENTS AND PROCESS FOR THEIR PREPARATION

(71) Applicant: BASELL POLIOLEFINE ITALIA S.R.L., Milan (IT)

(72) Inventor: Diego Brita, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 118 days.

(21) Appl. No.: 17/311,071

(22) PCT Filed: Dec. 2, 2019

(86) PCT No.: PCT/EP2019/083311
§ 371 (c)(1),
(2) Date: Jun. 4, 2021

(87) PCT Pub. No.: WO2020/114967
PCT Pub. Date: Jun. 11, 2020

(65) Prior Publication Data
US 2022/0041768 A1    Feb. 10, 2022

(30) Foreign Application Priority Data

Dec. 4, 2018 (EP) .................................... 18210161

(51) Int. Cl.
| | | |
|---|---|---|
| *C08F 110/06* | (2006.01) | |
| *C08F 4/654* | (2006.01) | |
| *C08F 4/651* | (2006.01) | |
| *C08F 2/44* | (2006.01) | |
| *C08F 4/646* | (2006.01) | |

(52) U.S. Cl.
CPC .............. *C08F 110/06* (2013.01); *C08F 2/44* (2013.01); *C08F 4/6465* (2013.01); *C08F 4/651* (2013.01); *C08F 4/6545* (2013.01)

(58) Field of Classification Search
CPC ............................. C08F 110/06; C08F 4/6545
See application file for complete search history.

(56) References Cited

U.S. PATENT DOCUMENTS

| | | |
|---|---|---|
| 4,233,206 A | 11/1980 | Katsura et al. |
| 4,564,647 A | 1/1986 | Hayashi et al. |
| 4,666,994 A | 5/1987 | Zboril |
| 10,030,121 B2 | 7/2018 | Bagui et al. |

FOREIGN PATENT DOCUMENTS

| | | |
|---|---|---|
| CN | 1284979 A | 2/2001 |
| CN | 107949587 A | 4/2018 |
| CN | 111094362 A | 5/2020 |
| GB | 810576 A | 3/1959 |
| JP | S60250002 A | 12/1985 |

OTHER PUBLICATIONS

International Search Report and Written Opinion dated Feb. 21, 2020 (dated Feb. 21, 2020) for Corresponding PCT/EP2019/083311.

Zhenhua Cheng et al., Advance on Supported/Immobilized Phthalocyannie Metal Catalyst, Industrial Catalysis, vol. 20, No. 8, Aug. 2012, pp. 6-12.

*Primary Examiner* — Catherine S Branch

(57) ABSTRACT

A process for the preparation of a solid catalyst component made from or containing a Ti compound, a coloring agent and optionally an electron donor on a Mg chloride based support, including step (a), carried out at a temperature ranging from 0 to 150° C., wherein (i) a Mg-based compound of formula $(MgCl_mX_{2-m}) \cdot nLB$, wherein m ranges from 0 to 2, n ranges from 0 to 6, X is, independently halogen, $R^1$, $OR^1$, $—OCOR^1$ or $O—C(O)—OR^1$ group, wherein $R^1$ is a $C_1$-$C_{20}$ hydrocarbon group and LB is a Lewis base, is reacted with (ii) a liquid medium made from or containing a Ti compound having at least a Ti—Cl bond in an amount such that the Ti/Mg molar ratio is greater than 3; and an organic coloring agent is present either associated to the Mg-based compound or dispersed in the liquid medium made from or containing the titanium compound.

14 Claims, No Drawings

ZN CATALYST COMPONENTS AND PROCESS FOR THEIR PREPARATION

This application is the U.S. National Phase of PCT International Application PCT/EP2019/083311, filed Dec. 2, 2019, claiming benefit of priority to European Patent Application No. 18210161.8, filed Dec. 4, 2018, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to a process for the preparation of a pigment containing solid catalyst component.

BACKGROUND OF THE INVENTION

In some instances, polyolefins are prepared into articles, using additive packages. In some instances, these packages are made from or containing stabilizers, clarifying agents to increase transparency, and coloring agents to increase or lower the intensity of color.

In some instances, the additive packages are added in the form of an "additive package" pre-blend, further made from or containing antioxidants, acid scavengers, slip agents, light stabilizers, optical brighteners, or UV light absorbers.

In some instances, the coloring agent is in the form of a masterbatch pre-mixed with polymer. Sometimes, the coloring agent is added during or just prior to the forming process. In some instances, a relatively high colorant loading of 500-1000 parts per million (ppm) is mixed and dispersed into a plastic in this manner.

In some instances, dispersing an additive into a polymer at very low loading levels is made through several steps of successive dilutions. In some instances, a very low loading level of additive is in the range of a few ppm.

SUMMARY OF THE INVENTION

In a general embodiment, the present disclosure provides a process for the preparation of a solid catalyst component for the homopolymerization or copolymerization of $CH_2$=CHR olefins, wherein R is hydrogen or hydrocarbyl radical with 1-12 carbon atoms, made from or containing a Ti compound, an organic coloring agent, and optionally an electron donor on a Mg chloride based support, including step (a), carried out at a temperature ranging from 0 to 150° C., wherein (i) a Mg-based compound of formula $(MgCl_mX_{2-m}) \cdot nLB$, where m ranges from 0 to 2, n ranges from 0 to 6, X is, independently halogen, $R^1$, $OR^1$, —$OCOR^1$ or O—C(O)—$OR^1$ group, wherein $R^1$ is a $C_1$-$C_{20}$ hydrocarbon group, and LB is a Lewis base, is reacted with (ii) a liquid medium made from or containing a Ti compound, having at least a Ti—Cl bond, in an amount such that the Ti/Mg molar ratio is greater than 3; and, in step (a), an organic coloring agent is present either associated to (i) the Mg-based compound or dispersed in (ii) the liquid medium made from or containing the titanium compound.

DETAILED DESCRIPTION OF THE INVENTION

In some embodiments, an organic coloring agent is a colored substance different from salts of metals belonging to groups 1-12 of the Periodic Table of Elements (IUPAC version), containing at least a C—H bond in the agent's structure.

In some embodiments, the organic coloring agent is dissolved or dispersed in a liquid medium made from or containing a titanium compound of formula $Ti(OR^1)_{q-y}Cl_y$, where q is the valence of titanium and y is a number between 1 and q and $R^1$ is a $C_1$-$C_{20}$ hydrocarbon group.

In some embodiments, the titanium compounds are titanium polyhalogenated compounds. In some embodiments, the titanium compounds are titanium tetrahalides or halogen alcoholates. In some embodiments, the titanium compounds are selected from the group consisting of $TiCl_4$ and $Ti(OEt)Cl_3$.

In some embodiments, the liquid medium made from or containing the Ti compound is a mixture of the Ti compound in another liquid diluent. In some embodiments, the diluents are hydrocarbons, optionally chlorinated, that are liquid at room temperature. In some embodiments, the liquid medium is made from or containing the liquid titanium compound.

In some embodiments, the magnesium-based compound used as a starting compound in step (a) is selected among adducts of formula $MgCl_2 \cdot nR^1OH$, where n is a number between 0.1 and 6, and $R^1$ is a hydrocarbon radical having 1-18 carbon atoms. In some embodiments, n ranges from 1 to 5, alternatively from 1.5 to 4.5.

In some embodiments, the adduct is prepared by mixing alcohol and magnesium chloride, operating under stirring conditions at the melting temperature of the adduct (100-130° C.). Then, the adduct is mixed with an inert hydrocarbon immiscible with the adduct thereby creating an emulsion which is quickly quenched causing the solidification of the adduct in the form of spherical particles. In some embodiments, the spherical adducts are prepared as described in U.S. Pat. No. 4,399,054 or 4,469,648.

In some embodiments, the spherulization occurs by a spray cooling method as described in U.S. Pat. No. 5,100,849 or 4,829,034. In some embodiments, the adducts having the final alcohol content are obtained by directly using the selected amount of alcohol during the adduct preparation.

In some embodiments, the adduct is directly reacted with the Ti compound or subjected to thermal controlled dealcoholation (80-130° C.), thereby obtaining an adduct wherein the number of moles of alcohol is lowered and the adduct's porosity is increased. In some embodiments, the dealcoholation is carried out and the number of moles of alcohol per mole of Mg is brought to less than 3, alternatively between 0.1 and 2.5.

In some embodiments, the reaction between the Mg-based compound and the Ti compound is carried out by suspending the Mg-based compound in large excess of cold $TiCl_4$. In some embodiments, the Mg-based compound is the $MgCl_2$-alcohol adduct. In some embodiments, the temperature of the cold $TiCl_4$ is 0° C. In some embodiments, the mixture is heated up to a temperature ranging from 60-140° C. and kept at this temperature for 0.1-4 hours, alternatively 0.5-2 hours. After that time, stirring is discontinued. After the solid particles settle, the liquid phase is removed.

In some embodiments, the reaction step (a) is carried out one or more times under identical or different conditions. In some embodiments, the temperature and duration of treatment are changed. In some embodiments, the number of steps (a) is between 1 and 3.

In some embodiments, the electron donor compound is added during one or more of the reaction steps (a) between the Mg-based compound and the liquid Ti compound.

In some embodiments, the electron donor compound is added at least during the first step (a) of reaction between the Mg-based compound and the Ti compound. In some embodiments, the addition of the electron donor compound is repeated one or two additional times.

In some embodiments, the electron donor compound is added as a fresh reactant to the solid intermediate catalyst component obtained by the reaction between the adduct and the Ti compound. In some embodiments, the electron donor compound is added as described in Patent Cooperation Treaty Publication No. WO2004/106388.

In some embodiments, the reaction step (a) is carried out by a continuous feeding of liquid Ti compound in an apparatus and as described in Patent Cooperation Treaty Publication No. WO02/48208. In some embodiments, the liquid Ti compound is TiCl$_4$. In some embodiments, the Mg-based compound is fed batchwise while a continuous stream of liquid Ti compound with the desired temperature profile is fed and a liquid phase containing dissolved reaction product is continuously withdrawn. In some embodiments, the organic coloring agent and, optionally, the electron donor are added at any time during the feeding of the Ti compound.

In some embodiments and in step (a), the organic coloring agent is either associated to (i) the Mg-based compound or dispersed in (ii) the liquid medium made from or containing the titanium compound.

In some embodiments, the organic coloring agent is dispersed in (ii) the liquid medium made from or containing the titanium compound.

In some embodiments, the organic coloring agent is selected from organic pigments. In some embodiments, the organic coloring agent is selected from derivatives of azoic, phthalocyanine and quinacridone structures.

In some embodiments, the pigments are phthalocyanine metal derivatives. In some embodiments, the pigments is Cu-Phthalocyanine.

In some embodiments, the amount of coloring agent dispersed or solubilized in the titanium compound ranges from 0.001 to 0.1 mole per mole of Mg compound used in the first step, alternatively from 0.010 to 0.080 mole per mole of Mg compound.

In some embodiments, the coloring agent is added to the reaction system already including the Mg-based compound in the liquid medium made from or containing the Ti compound. In some embodiments, the preparation of a liquid mixture includes the steps of dissolving or dispersing the coloring agent in the liquid medium made from or containing the Ti compound and then reacting the mixture with the Mg-based compound.

In some embodiments, the coloring agent is used in one or more reaction steps (a). In some embodiments, the coloring agent is used in a single step (a). In some embodiments, the process includes two steps (a) and the coloring agent is used in the first step (a).

In some embodiments and at the end of the last step (a), the solid catalyst component is subjected to washings with hydrocarbon solvents until chloride ions are no longer detectable.

In some embodiments, the process for the preparation of a solid catalyst component for the homopolymerization or copolymerization allows obtaining a catalyst component having a content of coloring agent such that the molar ratio coloring agent to Ti atoms is between 0.01:1 and 0.3:1, alternatively between 0.02:1 and 0.2:1.

In some embodiments, the particles of solid catalyst component have substantially spherical morphology and average diameter ranging between 5 and 150 µm, alternatively from 20 to 100 µm, alternatively from 30 to 90 µm. As used herein, "particles having substantially spherical morphology" indicates that the particles have the ratio between the greater axis and the smaller axis equal to or lower than 1.5, alternatively lower than 1.3.

In some embodiments, the amount of Mg ranges from 8 to 30% by weight, alternatively from 10 to 25% wt, with respect to the total weight of solid catalyst component.

In some embodiments, the amount of Ti ranges from 0.5 to 5% by weight, alternatively from 0.7 to 3% wt, with respect to the total weight of solid catalyst component.

In some embodiments, the internal electron donor is selected from the group consisting of ethers, amines, silanes, carbamates, ketones, esters of aliphatic acids, alkyl and aryl esters of optionally substituted aromatic polycarboxylic acids, diol derivatives, or mixtures thereof. In some embodiments, the diol derivatives are selected from the group consisting of dicarbamates, monoesters monocarbamates, and monoesters monocarbonates. In some embodiments, the internal electron donor is used in the first step (a).

In some embodiments, the alkyl and aryl esters of optionally substituted aromatic polycarboxylic acids are the esters of phthalic acids. In some embodiments, the esters of aliphatic acids are selected from esters of malonic, glutaric, maleic and succinic acids. In some embodiments, the esters are selected from the group consisting of n-butylphthalate, di-isobutylphthalate, and di-n-octylphthalate.

In some embodiments, the internal donors are selected from the group consisting of 1,3 diethers of the formula (I):

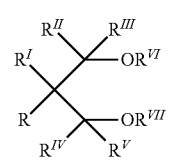

(I)

wherein R, $R^I$, $R^{II}$, $R^{III}$, $R^{IV}$ and $R^V$ are equal to or different from each other, and are hydrogen or hydrocarbon radicals having from 1 to 18 carbon atoms; and $R^{VI}$ and $R^{VII}$ are equal to or different from each other, and have the same meaning of R—$R^V$ except that $R^{VI}$ and $R^{VII}$ cannot be hydrogen. In some embodiments, one or more of the R—$R^{VII}$ groups are linked to form a cycle. In some embodiments, the 1,3-diethers have $R^{VI}$ and $R^{VII}$ selected from $C_1$-$C_4$ alkyl radicals. In some embodiments, mixtures of the donors are used. In some embodiments, the mixtures are made from or containing esters of succinic acids and 1,3 diethers as described in Patent Cooperation Treaty Publication No. WO2011/061134.

It is believed that to increase the capability of the catalyst to distribute an olefin co-monomer within a polymer chain, the electron donor is selected from the group consisting of monofunctional donors, ethers and $C_1$-$C_4$ alkyl esters of aliphatic mono carboxylic acids. In some embodiments, the resulting polymers are ethylene/α-olefin copolymers. In some embodiments, the ethers are $C_2$-$C_{20}$ aliphatic ethers, alternatively cyclic ethers. In some embodiments, the cyclic ethers have 3-5 carbon atoms. In some embodiments, the cyclic ethers are selected from the group consisting of tetrahydrofuran and dioxane. In some embodiments, the esters are selected from the group consisting of ethylacetate and methyl formiate. In some embodiments, the electron donor is selected from the group consisting of tetrahydrofuran and ethylacetate.

In some embodiments, the final amount of electron donor compound in the solid catalyst component ranges from 0.5 to 40 wt % by weight, alternatively from 1 to 35 wt %, with respect to the total weight of the solid catalyst component.

In some embodiments, the solid catalyst component shows a surface area (by B.E.T. method) between 20 and 500 $m^2/g$, alternatively between 50 and 400 $m^2/g$, and a total porosity (by B.E.T. method) greater than 0.2 $cm^3/g$, alternatively between 0.3 and 0.6 $cm^3/g$. In some embodiments, the porosity (Hg method) due to pores with radius up to 10.000 Å, ranges from 0.3 to 1.5 $cm^3/g$, alternatively from 0.45 to 1 $cm^3/g$.

In some embodiments, the solid catalyst component has an average particle size ranging from 5 to 120 μm, alternatively from 10 to 100 μm.

In some embodiments, the solid catalyst component is converted into catalyst for the polymerization of olefins by reacting the solid catalyst component with organoaluminum compounds.

In some embodiments, the organoaluminum compound is a trialkyl aluminum compound. In some embodiments, the trialkyl aluminum compound is selected from the group consisting of triethylaluminum, triisobutylaluminum, tri-n-butylaluminum, tri-n-hexylaluminum, and tri-n-octylaluminum. In some embodiments, the organoaluminum compound is selected from the group consisting of alkylaluminum halides, alkylaluminum hydrides, alkylaluminum sesquichlorides, and mixtures thereof with trialkylaluminums. In some embodiments, the alkylaluminum sesquichlorides are selected from the group consisting of $AlEt_2Cl$ and $Al_2Et_3Cl_3$.

In some embodiments, the Al/Ti molar ratio is such that there is an excess of Al. In some embodiments, the Al/Ti molar ratio ranges between 50:1 and 2000:1, alternatively between 50:1 and 500:1.

In some embodiments, an external electron-donor compound is used. In some embodiments, an external electron-donor compound is selected from the group consisting of silicon compounds, ethers, esters, amines, heterocyclic compounds, and ketones. In some embodiments, the heterocyclic compound is 2,2,6,6-tetramethylpiperidine. In some embodiments, the external donor compounds are silicon compounds of formula $(R_6)_a(R_7)_bSi(OR_8)_c$, where a and b are integers from 0 to 2, c is an integer from 1 to 4 and the sum of (a+b+c) is 4; $R_6$, $R_7$, and $R_8$, are alkyl, cycloalkyl or aryl radicals with 1-18 carbon atoms optionally containing heteroatoms. In some embodiments, the external electron-donor compounds are the silicon compounds wherein a is 1, b is 1, and c is 2, at least one of $R_6$ and $R_7$ is selected from branched alkyl, cycloalkyl or aryl groups with 3-10 carbon atoms optionally containing heteroatoms, and $R_8$ is a $C_1$-$C_{10}$ alkyl group. In some embodiments, $R_8$ is methyl. In some embodiments, the silicon compounds are selected from the group consisting of methylcyclohexyldimethoxysilane (C donor), diphenyldimethoxysilane, methyl-t-butyldimethoxysilane, dicyclopentyldimethoxysilane (D donor), diisopropyldimethoxysilane, (2-ethylpiperidinyl)t-butyldimethoxysilane, (2-ethylpiperidinyl)thexyldimethoxysilane, (3,3,3-trifluoro-n-propyl)(2-ethylpiperidinyl)dimethoxysilane, and methyl(3,3,3-trifluoro-n-propyl)dimethoxysilane. In some embodiments, the external electron, donor compounds are the silicon compounds wherein a is 0 and c is 3, $R_7$ is a branched alkyl or cycloalkyl group, optionally containing heteroatoms, and $R_8$ is methyl. In some embodiments, the silicon compounds are selected from the group consisting of cyclohexyltrimethoxysilane, t-butyltrimethoxysilane and thexyltrimethoxysilane.

In some embodiments, the external electron donor compound is used in such an amount to give a molar ratio of the organoaluminum compound to the external electron donor compound of from 0.1:1 to 500:1, alternatively from 1:1 to 300:1, alternatively from 3:1 to 100:1.

In some embodiments, the catalyst is used in a process for the homopolymerization or copolymerization of $CH_2=CHR$ olefins, wherein R is hydrogen or a hydrocarbyl radical with 1-12 carbon atoms. In some embodiments, the solid catalyst component for the polymerization of olefins is made from or containing Mg, Ti halogen, and an organic coloring agent selected from azoic, phthalocyanine, and quinacridone based pigments wherein the molar ratio of coloring agent to Ti atoms is between 0.01:1 and 0.3:1.

In some embodiments, the polymerization process is carried out in a slurry polymerization using as diluent an inert hydrocarbon solvent, or a bulk polymerization using the liquid monomer as a reaction medium. In some embodiments, the liquid monomer is propylene. In some embodiments, the polymerization process is carried out in gas-phase operating in one or more fluidized or mechanically agitated bed reactors.

In some embodiments, the polymerization is carried out at a temperature of from 20 to 120° C., alternatively from 40 to 80° C. In some embodiments, the polymerization is carried out in gas-phase and the operating pressure ranges between 0.5 and 5 MPa, alternatively between 1 and 4 MPa. In some embodiments and in the bulk polymerization, the operating pressure ranges between 1 and 8 MPa, alternatively between 1.5 and 5 MPa.

In some embodiments, the olefin polymers contain an amount of coloring agent ranging from 0.2 to 30, alternatively from 0.3 to 28 ppm, alternatively from 0.3 to 25 ppm, referred to the weight of polymer.

In some embodiments, the yellowness index of the polymer is reduced with respect to the yellowness index of the polymer not containing the coloring agent. In some embodiments, the reduction of yellowness index is obtained in combination with unchanged polymer properties. In some embodiments, the unchanged polymer property is stereoregularity (measured through Xylene Insolubility).

The following examples are given to better illustrate the disclosure without limiting it.

EXAMPLES

Characterizations
Determination of Mg, Ti

The determination of Mg and Ti content in the solid catalyst component was carried out via inductively coupled plasma emission spectroscopy on "I.C.P Spectrometer ARL Accuris".

The sample was prepared by analytically weighing 0.1=0.3 grams of catalyst and 2 grams of lithium metaborate/tetraborate 1/1 mixture. After addition of some drops of KI solution, the sample was completely burned. The residue was collected with a 5% v/v $HNO_3$ solution and then analyzed via ICP at the following wavelengths: Magnesium, 279.08 nm; Titanium, 368.52 nm.

Determination of Internal Donor Content

The content of internal donor in the solid catalytic compound was determined by gas chromatography. The solid component was dissolved in acetone, an internal reference was added, and a sample of the organic phase was analyzed in a gas chromatograph, thereby determining the amount of donor present at the starting catalyst compound.

Determination of coloring agent. Depending on the nature of the coloring agent, the coloring agent is determined by gas chromatography or by the residual metal on the catalyst for metal-based coloring agent.

Determination of X.I.

2.5 g of polymer and 250 ml of o-xylene were placed in a round-bottomed flask provided with a cooler and a reflux condenser and kept under nitrogen. The obtained mixture was heated to 135° C. and kept under stirring for about 60 minutes. The final solution was cooled to 25° C. under continuous stirring, and the insoluble polymer was then filtered. The filtrate was then evaporated in a nitrogen flow at 140° C. to reach a constant weight. The content of the xylene-soluble fraction is expressed as a percentage of the original 2.5 grams and then, by difference, the X.I. %.

Melt Flow Rate (MIL)

The melt flow rate (MIL) of the polymer was determined according to ISO 1133 (230° C., 2.16 Kg).

Yellowness Index

The determination of the yellowness index (YI) was obtained by directly measuring the X, Y and Z tristimulus coordinates on pellets using a tristimulus colorimeter capable of assessing the deviation of an object color from a pre-set standard white towards yellow in a dominant wavelength range between 570 and 580 nm. The geometric characteristics of the apparatus allowed perpendicular viewing of the light reflected by two light rays that hit the specimen at 45°, at an angle of 900 to each other, coming from a "Source C" according to CIE standard. After calibration, the glass container was filled with the pellets to be tested and the X, Y, Z coordinates were obtained to calculate the yellowness index according to the following equation:

$$YI=100*(1.274976795*X-1.058398178*Z)/Y$$

General Procedure for the Polymerization of Propylene

A 4-liter steel autoclave equipped with a stirrer, pressure gauge, thermometer, catalyst feeding system, monomer feeding lines and thermostatic jacket, was purged with a nitrogen flow at 70° C. for one hour. A suspension containing 75 ml of anhydrous hexane, 0.6 g of triethyl aluminum (AlEt$_3$, 5.3 mmol) and 0.006 to 0.010 g of solid catalyst component, pre-contacted for 5 minutes with 10 wt % of total AlEt$_3$ and an amount of dicyclopentyldimethoxysilane, thereby providing a molar ratio between Al/dicyclopentyldimethoxysilane of 20 in a glass-pot, was charged. The autoclave was closed, and hydrogen was added (4500 cc). Then, under stirring, 1.2 kg of liquid propylene was fed. The temperature was raised to 70° C. in about 10 minutes and the polymerization was carried out at this temperature for 2 hours. At the end of the polymerization, the non-reacted propylene was removed; the polymer was recovered and dried at 70° C. under vacuum for 3 hours. The resulting polymer was weighed and characterized.

General Procedure for the Preparation of MgCl$_2$.(EtOH)m Adducts.

An initial amount of microspheroidal MgCl$_2$.2.8C$_2$H$_5$OH was prepared according to the method described in Example 2 of U.S. Pat. No. 4,399,054. The resulting adduct had an average particle size of 25 μm.

Example 1 (Comparative)

Preparation of a 9,9-bis(methoxymethyl)fluorene Containing Solid Catalyst Component Into a 0.5 L round bottom glass reactor, equipped with mechanical stirrer, cooler, thermometer, and a filter in the bottom of the reactor, 250 cc of TiCl$_4$ were introduced at room temperature under a nitrogen atmosphere. After cooling to −5° C., while stirring, 13.6 g of microspheroidal complex of MgCl$_2$ and EtOH were introduced. The temperature was then raised from −5° C. to 40° C., and when this temperature was reached, 9,9-bis(methoxymethyl)fluorene, used as an internal electron donor, was introduced, thereby producing a Mg/9,9-bis(methoxymethyl)fluorene molar ratio of 5.

At the end of the addition, the temperature was increased to 100° C. and maintained at this value for 30 minutes. Thereafter, under stirring, the liquid was removed, filtering the Titanium dark slurry. Then, fresh TiCl$_4$ without any additional amount of donor was added. The whole slurry mixture was then heated at 109° C. and kept at this temperature for 30 minutes. A filtering step was repeated once again to separate solid product by the liquid, and a third TiCl$_4$ treatment was performed at 109° C. for 15 minutes.

The solid was washed with anhydrous i-hexane five times (5×250 cc) at 50° C. and one time (250 cc) at room temperature.

The solid was finally dried under vacuum, weighed, and analyzed.

Catalyst composition: Mg=13.2 wt %; Ti=5.1 wt %; I.D.=15.0 wt %.

The catalyst was used in the polymerization of propylene. Results are shown in Table 1.

Example 2

The procedure described in Example 1 was repeated with the exception that 0.3 g of Cu-Phthalocyanine were dissolved in the TiCl$_4$ used in the first reaction step. Catalyst composition: Mg=13.4 wt %; Ti=5.0 wt %; I.D.=15.8 wt %, Cu=0.2%.

The catalyst was used in the polymerization of propylene. Results are shown in Table 1.

Example 3 (Comparative)

The procedure described in Example 1 was repeated with the exception that 0.3 g of Ultramarine blue (inorganic pigment) were dissolved in the TiCl$_4$ used in the first reaction step. Catalyst composition: Mg=13.8 wt %; Ti=4.6 wt %; I.D.=16.7 wt %, Na=0.25%.

The catalyst was used in the polymerization of propylene. Results are shown in Table 1.

TABLE 1

| | | Characterization | |
| EXAMPLE | Ppm of pigment On final PP | XI % wt | Yellow Index |
| --- | --- | --- | --- |
| C1 | no | 98.6 | +1.4 |
| 2 | 0.9 | 98.4 | −7.7 |
| C3 | 0.1 | 97.6 | +0.5 |

What is claimed is:

1. A process for the preparation of a solid catalyst component for the homopolymerization or copolymerization of CH$_2$=CHR olefins, wherein R is hydrogen or hydrocarbyl radical with 1-12 carbon atoms, comprising a Ti compound, an organic coloring agent and optionally an electron donor on a Mg chloride based support, comprising:

step (a), carried out at a temperature ranging from 0 to 150° C., wherein
(i) a Mg-based compound of formula $(MgCl_mX_{2-m})\cdot nLB$, where m ranges from 0 to 2, n ranges from 0 to 6, X is, independently halogen, $R^1$, $OR^1$, $-OCOR^1$ or $O-C(O)-OR^1$ group, wherein $R^1$ is a $C_1$-$C_{20}$ hydrocarbon group, and LB is a Lewis base, is reacted with
(ii) a liquid medium comprising a Ti compound, having at least a Ti—Cl bond, in an amount such that the Ti/Mg molar ratio is greater than 3; and in step (a), an organic coloring agent is present either associated to (i) the Mg-based compound or dispersed in (ii) the liquid medium comprising the titanium compound.

2. The process according to claim 1, wherein the organic coloring agent is dissolved or dispersed in a liquid medium comprising a Ti compound of formula $Ti(OR^1)_{q-y}Cl_y$, where q is the valence of the titanium and y is a number between 1 and q and $R^1$ is a $C_1$-$C_{20}$ hydrocarbon group.

3. The process according to claim 1, wherein the Mg-based compound is selected from adducts of formula $MgCl_2 \cdot nR_1OH$, where n is a number between 0.1 and 6, and $R^1$ is a $C_1$-$C_{18}$ hydrocarbon group.

4. The process according to claim 1, wherein the liquid medium consists of a Ti compound.

5. The process according to claim 4, wherein the reaction temperature is from 60 to 140° C.

6. The process according to claim 1, wherein the organic coloring agent is an organic pigment selected from derivatives of azoic, phthalocyanine and quinacridone structures.

7. The process according to claim 6, wherein the organic coloring agent is a phthalocyanine metal derivative.

8. The process according to claim 1, wherein the organic coloring agent dispersed or solubilized in the titanium compound ranges from 0.001 to 0.1 mole per mole of Mg compound.

9. The process according to claim 1, wherein step (a) is repeated to include a first step (a) and a second step (a), and the organic coloring agent is added in the first step (a).

10. The process according to claim 1, further comprising in the step (a) adding an internal electron donor compound selected from the group consisting of alkyl and aryl esters of optionally substituted aromatic polycarboxylic acids, esters of malonic acids, esters of glutaric acids, esters of maleic acids, esters of succinic acids, and diol derivatives selected from the group consisting of dicarbamates, monoesters monocarbamates and monoesters monocarbonates, and 1,3 diethers of the formula:

wherein R, $R^I$, $R^{II}$, $R^{III}$, $R^{IV}$ and $R^V$ are equal to or different from each other, and are hydrogen or hydrocarbon radicals having from 1 to 18 carbon atoms, and $R^{VI}$ and $R^{VII}$ are equal to or different from each other, and have the same meaning of R-$R^V$ except that $R^{VI}$ and $R^{VII}$ cannot be hydrogen.

11. The process according to claim 10, wherein step (a) is repeated to include a first step (a) and a second step (a), and the internal donor is added in the first step (a).

12. A solid catalyst component for the polymerization of olefins comprising Mg, Ti halogen, and an organic coloring agent selected from azoic, phthalocyanine, and quinacridone based pigments, wherein the molar ratio of coloring agent to Ti atoms is between 0.01:1 and 0.3:1.

13. The solid catalyst according to claim 12, wherein the coloring agent is a phthalocyanine metal based pigment.

14. The solid catalyst according to claim 13, wherein the coloring agent is Cu-phthalocyanine.

\* \* \* \* \*

UNITED STATES PATENT AND TRADEMARK OFFICE
CERTIFICATE OF CORRECTION

PATENT NO. : 11,673,981 B2
APPLICATION NO. : 17/311071
DATED : June 13, 2023
INVENTOR(S) : Brita It is certified that error appears in the above-identified patent and that said Letters Patent is hereby corrected as shown below:

On the Title Page

Column 1, item [30], Line 1, delete "18210161" and insert -- 18210161.8 --, therefor In the Specification In Column 4, Line 44, delete "$R^V$" and insert -- $R^{VI}$ --, therefor In Column 6, Line 57, delete "0.1=0.3" and insert -- 0.1÷0.3 --, therefor In Column 7, Line 29, delete "900" and insert -- 90° --, therefor In the Claims In Column 9, Claim 3, Line 21, delete "$MgCl_2.nR_1OH$" and insert -- $MgCl_2 \cdot nR^1OH$ --, therefor Signed and Sealed this
Eleventh Day of February, 2025

Coke Morgan Stewart
*Acting Director of the United States Patent and Trademark Office*